(12) United States Patent
Liggins (10) Patent No.: US 8,416,428 B2
(45) Date of Patent: Apr. 9, 2013

(54) DETECTION METHODS AND SYSTEMS

(75) Inventor: Joel Mark Liggins, Jackson, TN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 357 days.

(21) Appl. No.: 12/612,963

(22) Filed: Nov. 5, 2009

(65) Prior Publication Data

US 2011/0102807 A1    May 5, 2011

(51) Int. Cl.
*G01B 11/14*   (2006.01)

(52) U.S. Cl. .................. 356/614; 356/237.2; 356/237.6; 356/600; 209/582

(58) Field of Classification Search .... 356/237.2–237.6, 356/614
See application file for complete search history.

(56) References Cited

U.S. PATENT DOCUMENTS

| | | | |
|---|---|---|---|
| 4,055,834 A | 10/1977 | Planke | |
| 4,063,820 A | 12/1977 | Borgese | |
| 5,501,571 A * | 3/1996 | Van Durrett et al. | 414/801 |
| 5,606,534 A * | 2/1997 | Stringer et al. | 367/128 |
| 5,636,020 A | 6/1997 | Csipkes et al. | |
| 5,699,161 A * | 12/1997 | Woodworth | 356/628 |
| 5,815,274 A * | 9/1998 | Dlugos | 356/634 |
| 6,049,379 A * | 4/2000 | Lucas | 356/240.1 |
| 6,089,108 A * | 7/2000 | Lucas | 73/865.8 |
| 7,126,144 B2 * | 10/2006 | De Coi | 250/559.12 |
| 7,924,421 B2 * | 4/2011 | Schmidt et al. | 356/239.4 |

FOREIGN PATENT DOCUMENTS

SU           581048        11/1977

* cited by examiner

*Primary Examiner* — Tarifur Chowdhury
*Assistant Examiner* — Isiaka Akanbi
(74) *Attorney, Agent, or Firm* — Dinsmore & Shohl LLP (57) ABSTRACT

A method for obtaining a measurement in an in-line system for detecting presence of an out-of-parameter part is provided. The method includes conveying a tubular member to a detection system comprising a laser sensor arranged and configured to direct a beam of light onto an upper end surface of the tubular member for obtaining a measurement. The laser sensor is offset from a center of the tubular member such that the beam of light is directed onto an outer side of the upper end surface. The beam of light is directed onto the upper end surface at the outer side of the tubular member and the beam of light moves from a front quadrant of the upper end surface to a rearward quadrant of the upper end surface.

20 Claims, 12 Drawing Sheets

DETECTION METHODS AND SYSTEMS

TECHNICAL FIELD

The present specification generally relates to detection methods and systems used in in-line manufacturing processes to separate parts.

BACKGROUND

In the vehicle manufacturing environment, it is not uncommon to produce multiple vehicle types at the same location. Different vehicles may require different parts to assemble the vehicle. Thus, different parts may be delivered to the same location and there may be opportunities to inadvertently introduce parts into a particular assembly process that should not be there, particularly if the different parts are similar. Accordingly, detection systems and methods are desired for quality assurance in assembly processes.

SUMMARY

In one embodiment, a method for obtaining a measurement in an in-line system for detecting presence of an out-of-parameter part is provided. The method includes conveying a tubular member to a detection system comprising a laser sensor arranged and configured to direct a beam of light onto an upper end surface of the tubular member for obtaining a measurement, the laser sensor being offset from a center of the tubular member such that the beam of light is directed onto an outer side of the upper end surface; and directing the beam of light onto the upper end surface at the outer side of the tubular member, the beam of light moving from a front quadrant of the upper end surface to a rearward quadrant of the upper end surface.

In another embodiment, a method of detecting presence of an out-of-parameter part among multiple parts includes setting a baseline measurement for each of a plurality of laser sensors; and conveying a row of tubular members to a detection system comprising the plurality of laser sensors, the plurality of laser sensors being arranged and configured to direct a beam of light onto an upper end surface of the tubular members for obtaining an in-line measurement; wherein an output is provided by one or more of the laser sensors if the in-line measurement is outside the baseline measurement.

In another embodiment, a system for use in detecting presence of an out-of-parameter part in an in-line process includes a conveyor system that conveys a tubular member in a conveying direction. A frame is located above the conveyor system. A laser sensor is supported by the frame above the conveyor system. The laser sensor is arranged and configured to direct a beam of light onto an upper end surface of a tubular member for obtaining an in-line measurement. The laser sensor is offset from a center of the tubular member in a cross-conveying direction such that the beam of light is directed onto an outer side of the upper end surface of the tubular member. The beam of light moves along a continuous path relative to the tubular member from a front quadrant of the upper end surface to a rearward quadrant of the upper end surface as the tubular member is conveyed in the conveying direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally refer to detection systems and methods used in a manufacturing process for differentiating between similar, but not identical parts. The detection systems and methods may be used to detect the presence of one or more parts having a dimension falling outside a predetermined parameter (hereinafter referred to as an "out-of-parameter part") during an in-line manufacturing process. As used herein, an "in-line process" is a process including several process steps that are carried out in interconnected process stations. The detection systems and methods may alert a user of the presence of the out-of-parameter part so that the out-of-parameter part can be removed from the in-line process.

Figure 1:
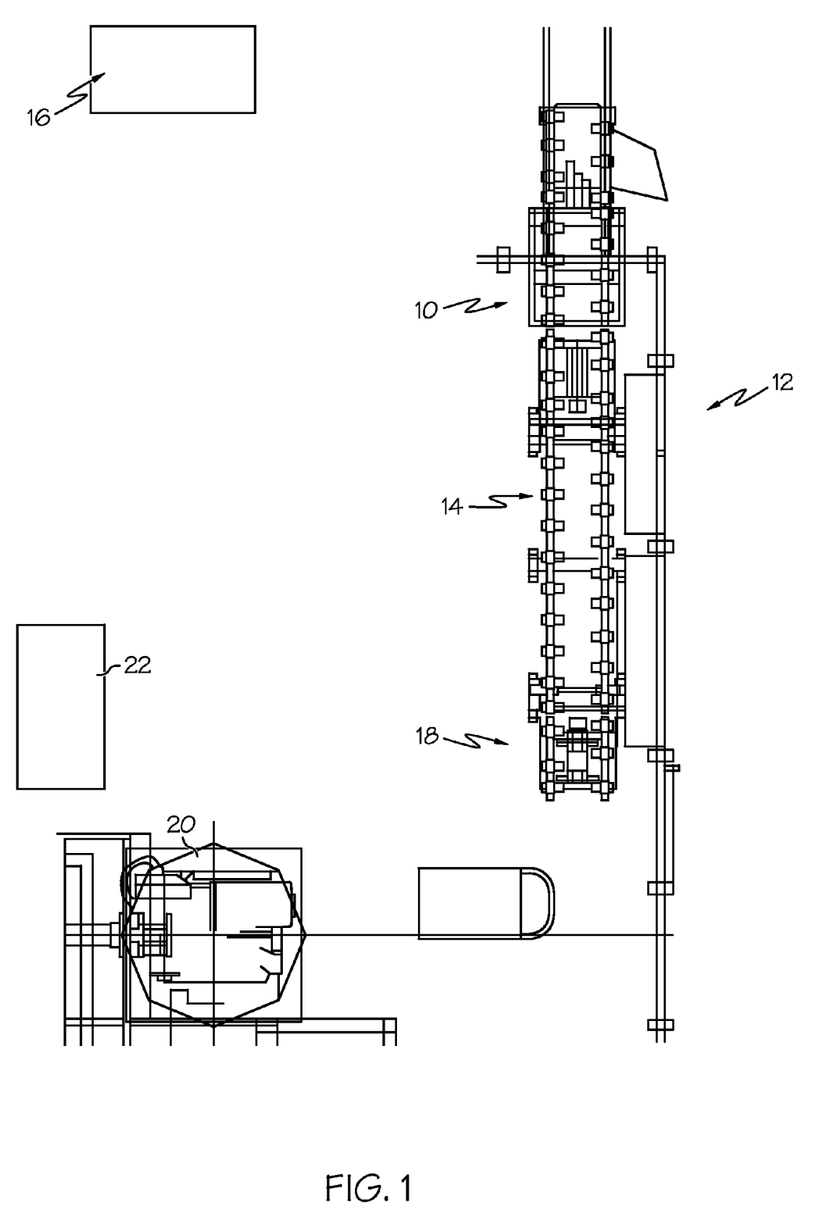
FIG. 1 is a diagrammatic plan view of an in-line system according to one or more embodiments shown and described herein.

Referring to FIG. 1, in one embodiment, the detection system 10 may be part of an in-line system 12 for manufacturing an engine block, as an example. As part of the in-line system 12, a conveyor system 14 may be used to transport cylinder liners from an operator location 16 to an unloading location 18. An unloading device 20, such as an unloading robot, may be used to transfer the cylinder liners to a die cast machine 22 where an engine block is die cast including the cylinder liners.

In some embodiments, the in-line system 12 (or a different system within a manufacturing plant) may be used to manufacture engine blocks of different sizes, instead of only one size. For example, both a V8 engine (i.e., a V engine with eight cylinders mounted on a crankcase in two banks of four cylinders) and a V6 engine (i.e., a V engine with six cylinders mounted on a crankcase in two banks of three cylinders) may be manufactured using the in-line system 12 during different production runs. One engine type may require cylinder liners of one size during the first production run and a different engine type may require cylinder liners of a different size during a subsequent production run.

Figure 2:
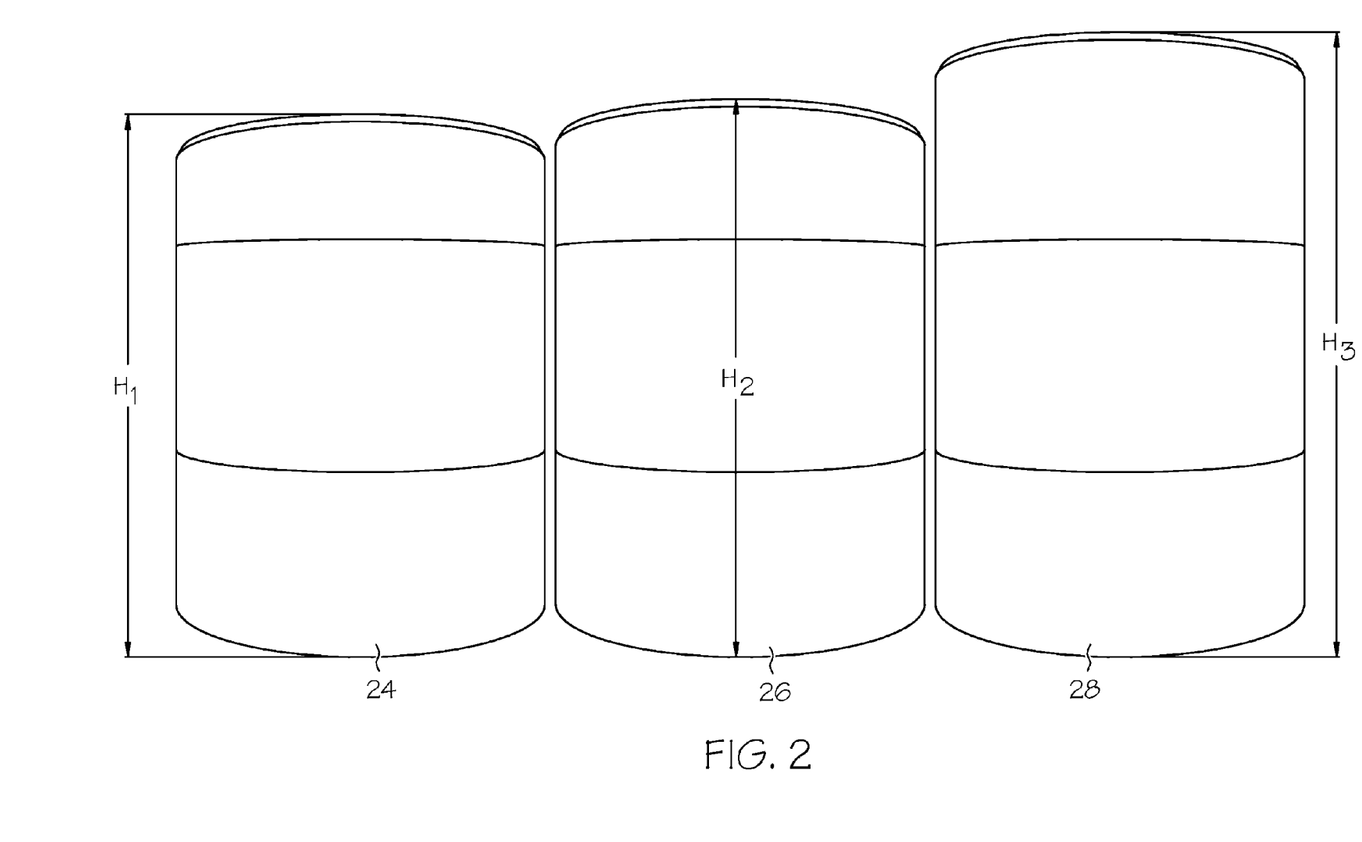
FIG. 2 illustrates three cylinder liners for use in manufacturing a vehicle engine using the in-line system of FIG. 1 according to one or more embodiments shown and described herein.

Referring to FIG. 2, three exemplary cylinder liner types 24, 26 and 28 are illustrated having different heights $H_1$, $H_2$ and $H_3$, respectively. As can be seen, cylinder liner 24 has the height $H_1$ (e.g., about 124.5 mm) that is shorter than both cylinder liners 26 and 28. Cylinder liner 26 has the height $H_2$ (e.g., about 127.1 mm) that is taller than cylinder liner 24 and shorter than cylinder liner 28. Cylinder liner 28 is the tallest having the height $H_3$ (e.g., about 143.6 mm) that is greater than cylinder liners 24 and 26. While the cylinder liners 24, 26 and 28 have different heights, the cylinder liners 24, 26 and 28 may have substantially the same (or different) inner diameter, outer diameter and/or wall thickness. In the illustrated embodiment, the cylinder liners 24, 26, and 28 have substantially the same inner diameter, outer diameter and wall thickness. Each cylinder liner type 24, 26 and 28 may be used in forming an engine block of a different size.

Figure 3:
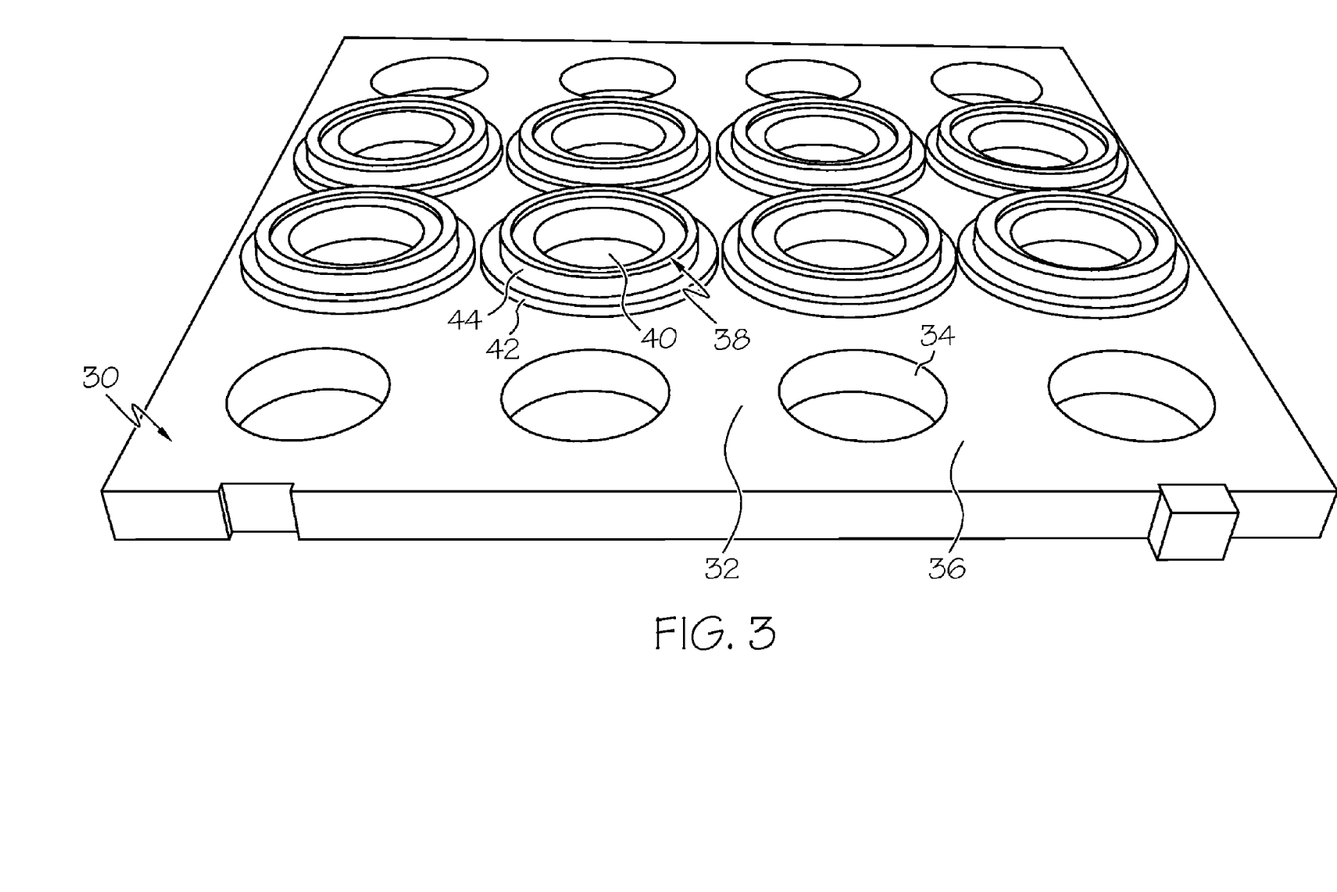
FIG. 3 illustrates a pallet for conveying the cylinder liners of FIG. 2 according to one or more embodiments shown and described herein.

Referring now to FIG. 3, a pallet 30 may be used to introduce the cylinder liners 24, 26 and/or 28 to the conveyor system 14. The pallet 30 includes a base plate 32 with openings 34 arranged over a broad surface 36 of the base plate 32 in substantially equally spaced columns and rows. In some embodiments, adjacent openings 34 may be spaced-apart about 10 mm or more, such as about 20 mm or more. In the illustrated embodiment, the pallet 30 has four columns and four rows of openings 34, however, the pallet 30 may have more or less than four columns and/or rows of openings 34. The openings 34 may be sized to receive risers 38 having a bottom portion 40 that can be removably received within the openings 34, a flange portion 42 that seats against the broad surface 36 and is larger in diameter than the openings 34 and a top portion 44 that is sized to be received within a bore of the cylinders 24, 26 and/or 28. In some embodiments, the top portion 44 and/or the bottom portion 40 have an outer diameter that is smaller than the outer diameter of the flange portion 42. In one embodiment, a thickness of the flange portion 42 is about 0.5 inch.

Figure 4:
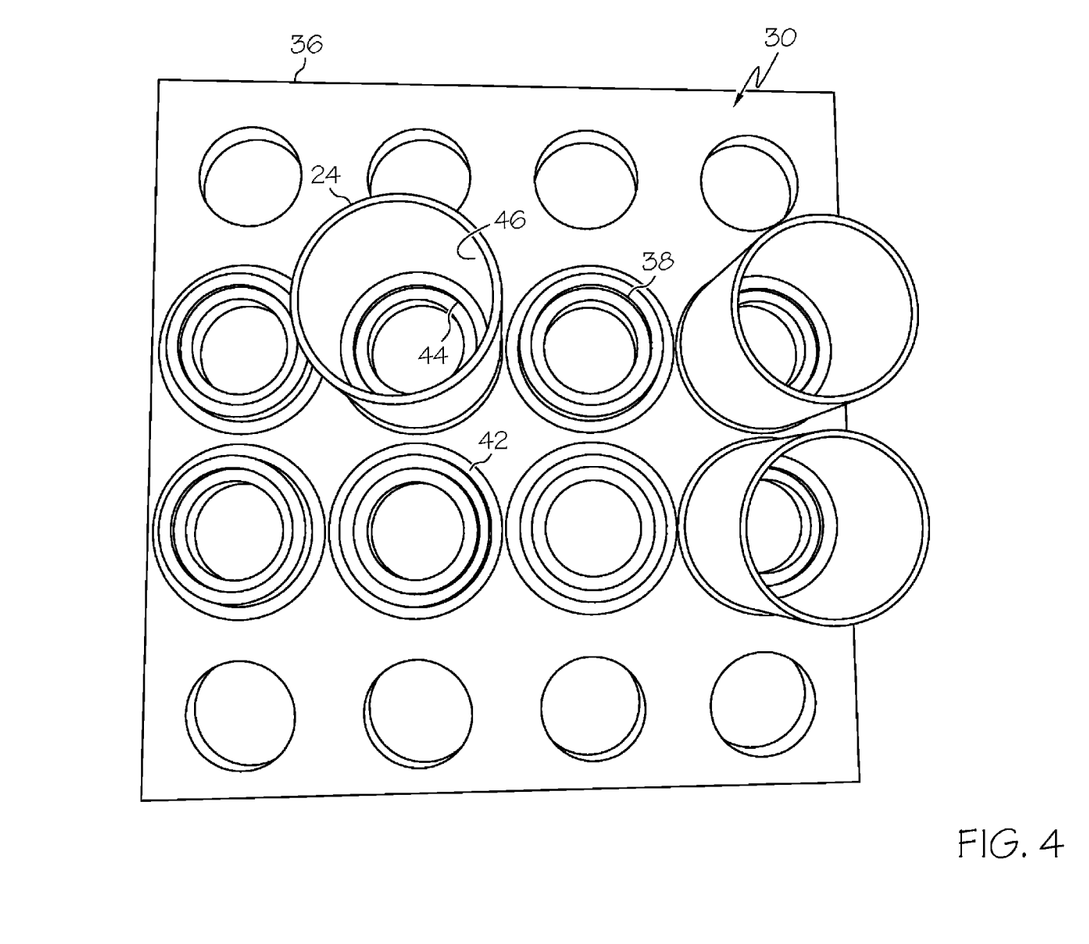
FIG. 4 illustrates cylinder liners being carried by the pallet of FIG. 3 according to one or more embodiments shown and described herein.

Referring to FIG. 4, the pallet 30 is illustrated supporting cylinder liners 24, 26 and/or 28. The top portions 44 of the risers 38 are received within the bores 46 of the cylinder liners 24, 26 and 28 with the cylinder liners 24, 26 and 28 resting on the flange portion 42, spaced vertically from the broad surface 36 of the pallet 30. The risers 38 support the cylinder liners 24, 26 and 28 in the illustrated upright, standing orientations and inhibit tipping of the cylinder liners 24, 26 and 28 during their transport on the pallet 30. The pallet 30 is shown carrying up to eight cylinder liners 24, 26 and/or 28 (e.g., corresponding to an eight cylinder engine). However, the pallet 30 may carry more or less than eight cylinder liners 24, 26 and/or 28 depending on the engine manufacturing requirements.

Figure 5:
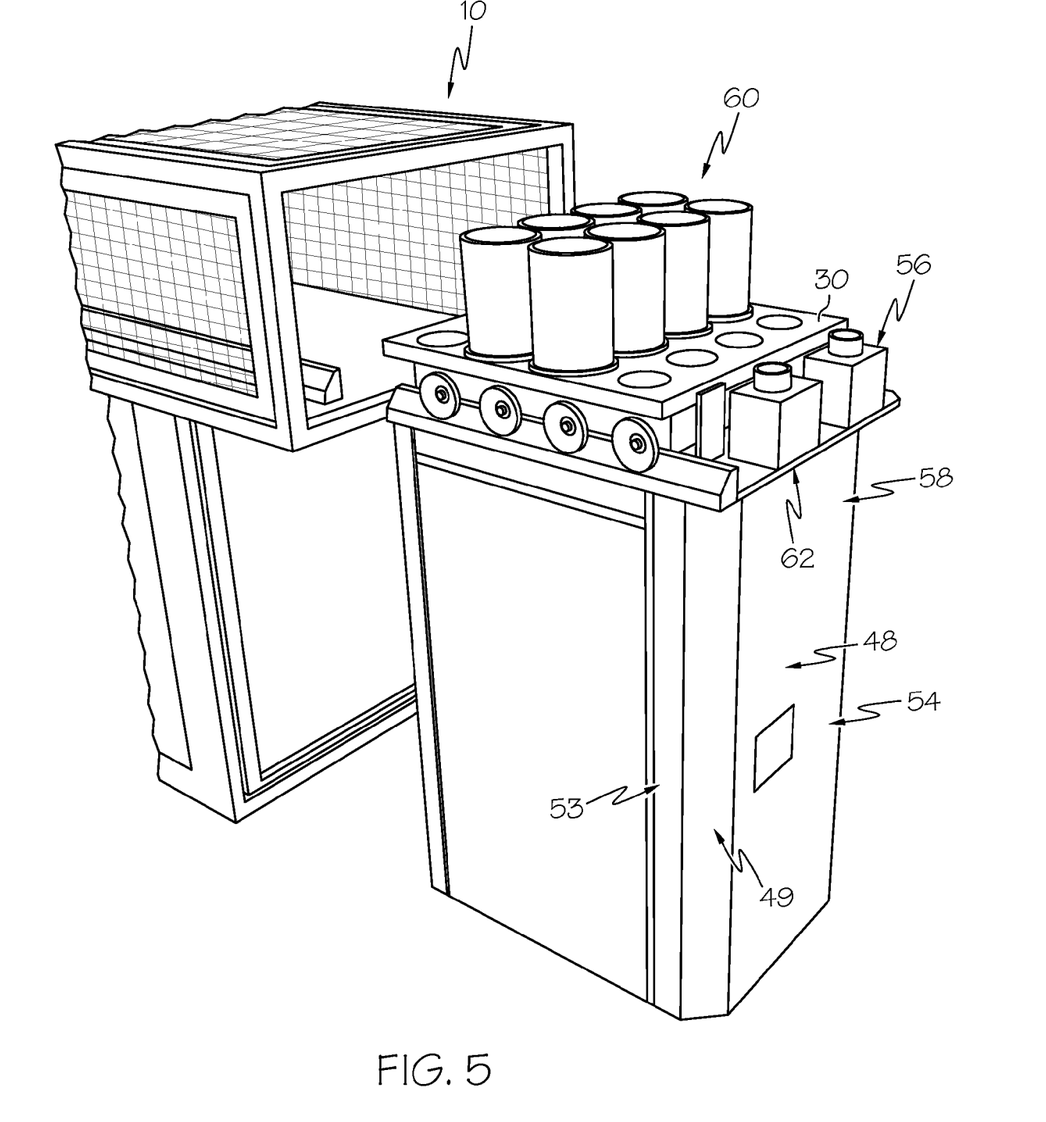
FIG. 5 illustrates the pallet of FIG. 3 on a cart according to one or more embodiments shown and described herein.

Referring to FIG. 5, the pallet 30 may be transported to the conveyor system 14 on a cart 48. The cart 48 may include a frame 49, sides 53 and 54, a top 56, a rear 58 for receiving a pallet 30 and an exit 60 for a departing pallet 30. In some embodiments, the cart 48 may be a powered cart 48 that includes electric actuators 62 (e.g., motors) operatively connected to conveyor elements (e.g., wheels) that are used to convey the pallet 30 from the cart 48 through the exit 60 when the cart 48 is aligned with the detection system 10.

In some embodiments, it may be desirable for the pallet 30 to carry cylinder liners 24, 26 or 28 all of the same size for production of a particular engine type. As mentioned above, in some instances, the pallet 30 may be loaded with cylinder liners 24, 26 and/or 28 of different sizes (e.g., heights $H_1$, $H_2$ and/or $H_3$). The cylinder liners 24, 26 and/or 28 may be loaded onto the pallet 30 manually or automatically, e.g., using a robot. Because cylinder liners 24, 26 and/or 28 of different heights $H_1$, $H_2$ and/or $H_3$ may be used by the in-line system 12, it may be possible that cylinder liners 24, 26 and/or 28 of the different heights $H_1$, $H_2$ and/or $H_3$ be introduced inadvertently to the in-line system 12. The in-line system 12 includes the detection system 10 (FIG. 1), which is used to detect out-of-parameter cylinders 24, 26 and/or 28 (i.e., cylinders not of the required size) during a production run.

Figure 10:
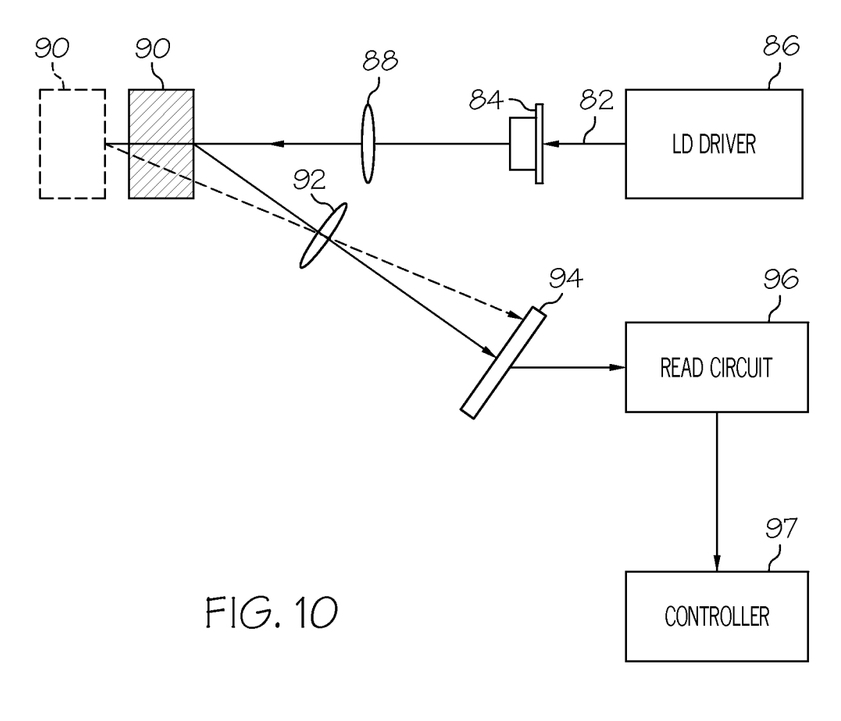
FIG. 10 illustrates a schematic view of a laser sensor according to one or more embodiments shown and described herein.

FIGS. 6-9 diagrammatically illustrate at least a portion of the detection system 10 isolated from the in-line system 12. The detection system 10 generally includes a sensor array 70 supported above the cylinder liners 24, 26 and/or 28 by a frame 72. The sensor array 70 includes sensors 74, 76, 78 and 80 that are spaced apart from each other in a cross-conveying direction. As one exemplary embodiment, the sensors 74, 76, 78 and 80 may be optical displacement meters, also called laser displacement meters, used for measuring a displacement of an object in a non-contact manner using the principle of triangulation. FIG. 10 diagrammatically illustrates operation of a laser displacement meter where a laser beam 82 emitted from a laser diode 84 under control of a driver 86 passes through a projection lens 88 and falls on a work 90. A part of the laser beam reflected from the work 90 passes through a light reception lens 92 and is received by a two-dimensional light receiving device 94. The two-dimensional light receiving device 94 may be a CCD or CMOS image sensor in which a plurality of pixel construction parts are arranged in a plane. At each of the pixel construction parts, a charge corresponding to a light reception amount is accumulated and is taken out.

When the work 90 is displaced as shown by broken lines in FIG. 10, the optical path of the laser beam is reflected from the work 90 and arrives at the two-dimensional light receiving device 94 changes as shown by a broken line. As a result, the position of a light spot in the light receiving surface of the two-dimensional light receiving device 94 moves, and the shape of the light reception signal waveform, that is, the position of a light reception image focused on the two-dimensional light receiving device 94 changes. The accumulated charge according to the light reception amount in each of the pixel construction parts of the two-dimensional light receiving device 94 is read by a read circuit 96, and the light reception waveform as a one-dimensional light reception amount distribution is obtained by signal processing. The displacement of the work 90 is obtained from the peak position of the light reception waveform or the centroid of the light reception waveform. Based on the obtained displacement of the work 90, an output may be provided to a controller 97, which may, in turn, control operation of the conveyor system 14, the laser sensors 74, 76, 78 and/or 80, etc. Various suitable laser displacement meters for use as sensors 74, 76, 78 and 80 (e.g., digital CMOS laser sensors) may be commercially available from Keyence Corporation headquartered in Osaka, Japan.

Referring back to FIGS. 6-9, the sensors 74, 76, 78 and 80 are supported above the cylinder liners 24, 26 and/or 28 by the frame 72. The frame 72 may include vertical supports 98 and 100 that extend vertically from the conveyor system 14 (represented by arrow 14). A horizontal framework 102 is supported above the conveyor system 14 and includes horizontal supports 104 and 106 extending in the conveying direction and horizontal supports 108 and 110 extending in the cross-conveying direction. A support rod 112 may extend between the supports 104, 106 and supports 108, 110. The support rod 112 may be adjustably mounted at opposite ends 114 and 116 to the supports 104 and 106 using adjustable brackets 118 and 120.

A proximity sensor 121 (e.g., a thru-beam sensor or other suitable sensor such as a reflective sensor) is mounted to the adjustable brackets 118 and 120. As one exemplary embodiment, the proximity sensor 121 may include a transmitter 123 mounted to the adjustable bracket 120 and a receiver 125 mounted to the adjustable bracket 118 or vice versa. The transmitter 123 may emit a light, for example, in the infrared or visible red wavelength range. The receiver 125 may detect the light beam and immediately convert a beam interruption caused by an object (i.e., the cylinder liner 24, 26 and/or 28) in the sensing zone into an output signal.

Figures 11A, 11B:
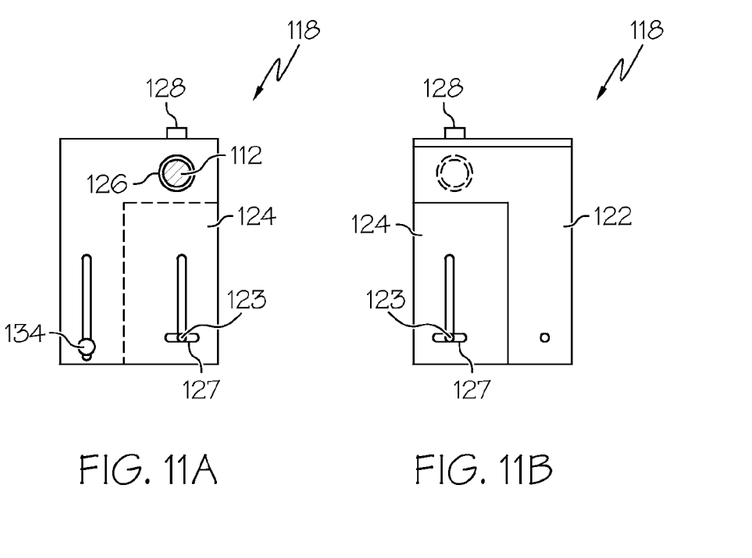
FIG. 11A illustrates an adjustable bracket according to one or more embodiments shown and described herein.
FIG. 11B illustrates an opposite side of the adjustable bracket of FIG. 11A according to one or more embodiments shown and described herein.

FIGS. 11A and 11B illustrate one exemplary embodiment of an adjustable connection between the support rod 112 and the adjustable brackets 118 and 120. Only one adjustable bracket 118 is illustrated, however, both brackets 118 and 120 may have the same or similar components and features. Each adjustable bracket 118 and 120 may include a fixed mounting component 122 that is fixedly mounted to its respective support 104 and 106 and an adjustable mounting component 124 that is adjustably connected to the fixed mounting component 122. The support rod 112 may be slidably received within openings 126 in each adjustable bracket 118 and 120. A cross-conveyor locking mechanism 128 (e.g., an adjustment screw) may be provided in the adjustable mounting components 124 that can be loosened to allow for adjustment of the support rod 112 in the cross-conveyor direction and rotation of the support rod 112 relative to the adjustable brackets 118 and 120 and tightened to fix a position of the support rod 112 relative to the frame 72. In other embodiments, the support rod 112 may not be adjustable (e.g., rotatable). A vertical locking mechanism 134 (e.g., an adjustment screw) may be provided that can be loosened to allow vertical adjustment of the adjustable mounting component 124 relative to the fixed mounting component 122 and tightened to fix the vertical position of the adjustable mounting component 124 relative to the fixed mounting component 122. Adjustment of the adjustable mounting component 124 vertically, provides for vertical adjustment of the support rod 112. A slot 127 may also be provided in the adjustable mounting component 124 to allow for adjustment of the proximity sensor 121 components here the transmitter 123 in the conveying and/or vertical directions.

Referring back to FIGS. 6-9, the sensors 74, 76, 78 and 80 are adjustably mounted to the support rod 112 using locking mechanisms 136 (e.g., an adjustment screw) and mounting brackets 138 to which the sensors 74, 76, 78 and 80 are mounted. Each sensor 74, 76, 78 and 80 may be individually adjustable (e.g., rotationally and/or in the cross-conveyor direction relative to the support rod 112) or the sensors 74, 76, 78 and 80 may be interconnected so that the sensors 74, 76, 78 and 80 may be adjustable together relative to the support rod 112 (e.g., to maintain a preselected cross-conveyor spacing between adjacent sensors 74, 76, 78 and/or 80).

Figure 6:
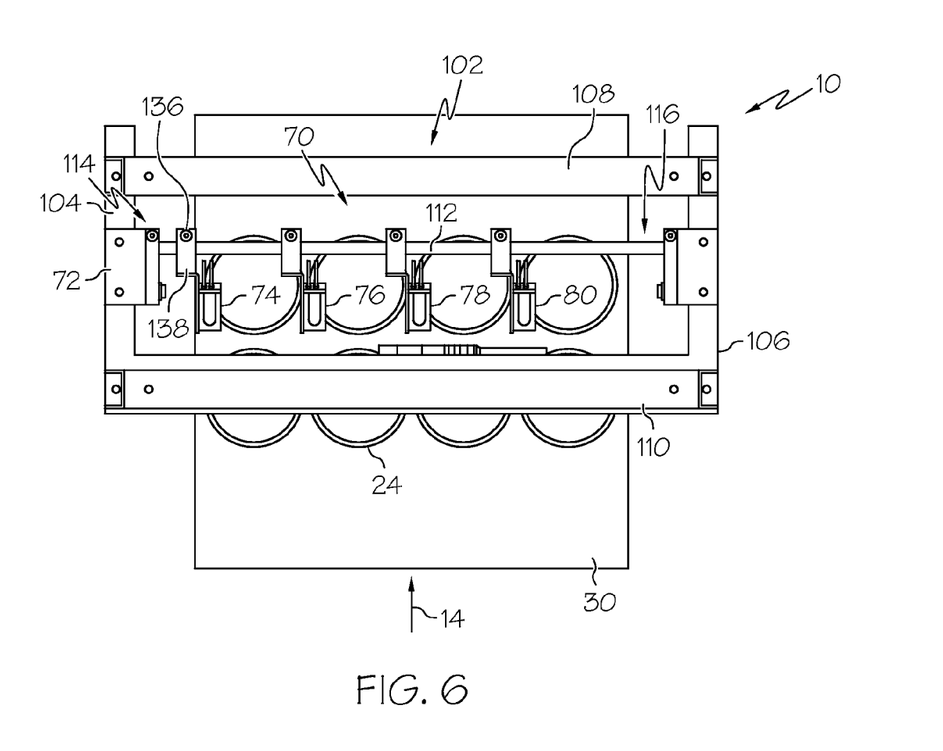
FIG. 6 illustrates a diagrammatic plan view of a detection system for detecting out-of-parameter parts according to one or more embodiments shown and described herein.
Figure 7:
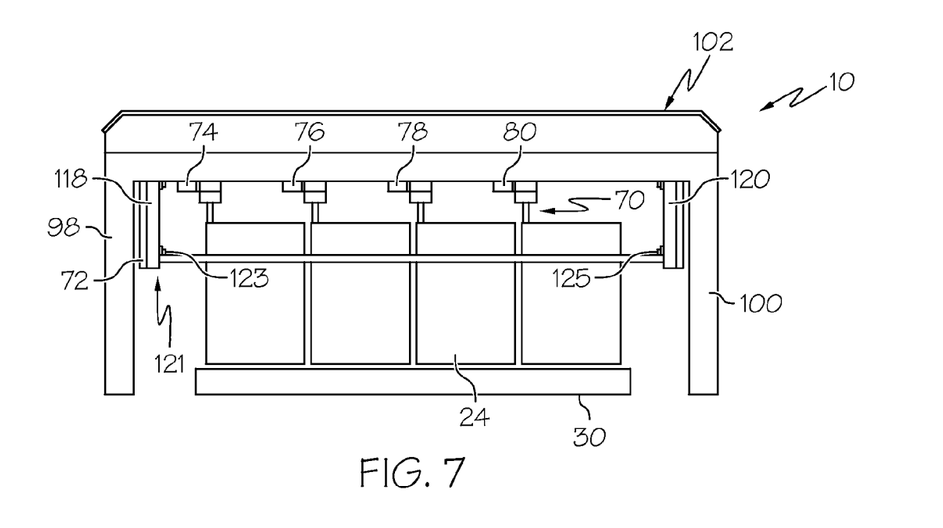
FIG. 7 illustrates a diagrammatic rear view of the detection system of FIG. 6 according to one or more embodiments shown and described herein.
Figure 8:
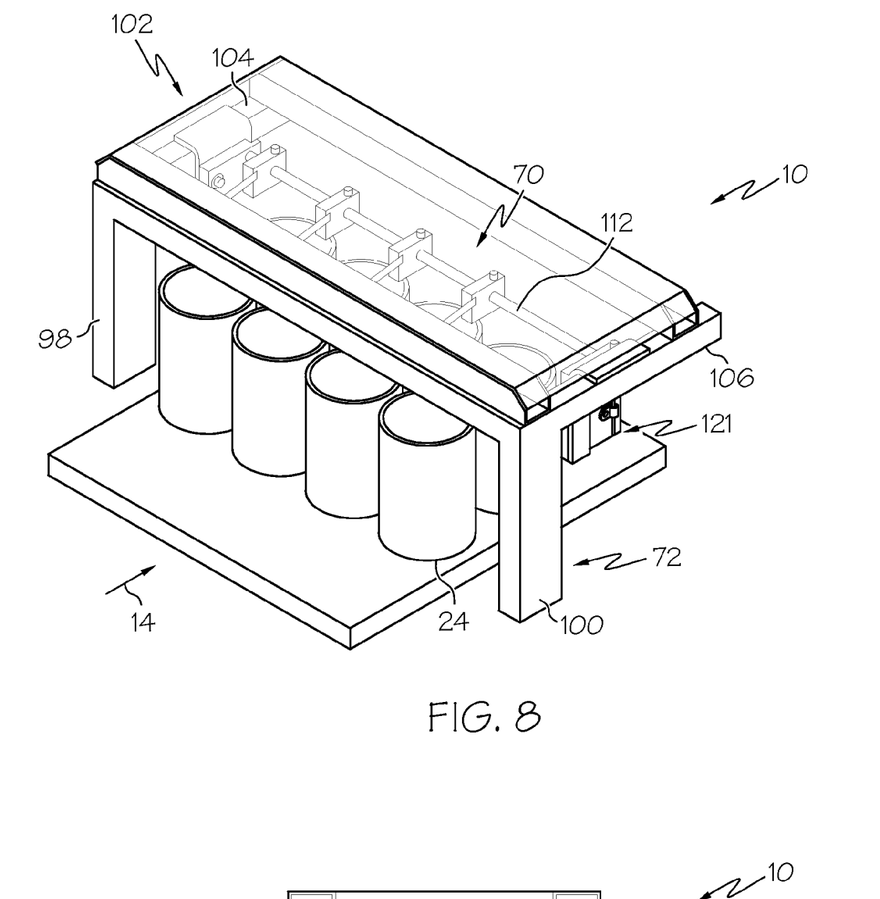
FIG. 8 illustrates a diagrammatic perspective view of the detection system of FIG. 6 according to one or more embodiments shown and described herein.
Figure 9:
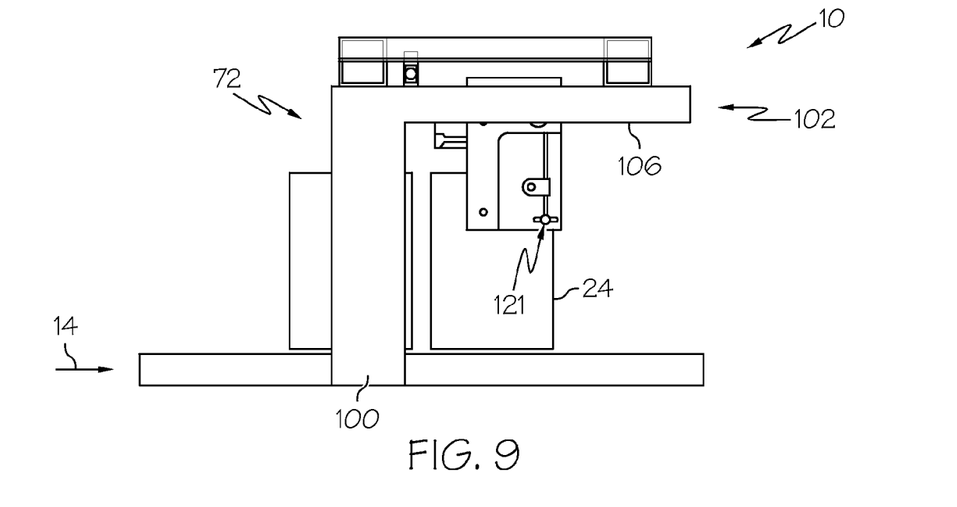
FIG. 9 illustrates a diagrammatic side view of the detecting system of FIG. 6 according to one or more embodiments shown and described herein.

Referring particularly to FIGS. 6 and 7, the sensors 74, 76, 78 and 80 are mounted in a vertical orientation so that the sensors 74, 76, 78 and 80 can detect an upper end surface 140 of the cylinder liners 24, 26 and/or 28. In embodiments where the sensors 74, 76, 78 and 80 are digital CMOS laser sensors, the sensors 74, 76, 78 and 80 may be used to detect distance to the upper end surface 140 of the cylinder liners 24, 26 and/or 28. This distance to the upper end surface 140 of the cylinder liners 24, 26 and/or 28 may be used to determine whether an out-of-parameter cylinder liner is located on the pallet 30.

Figure 12:
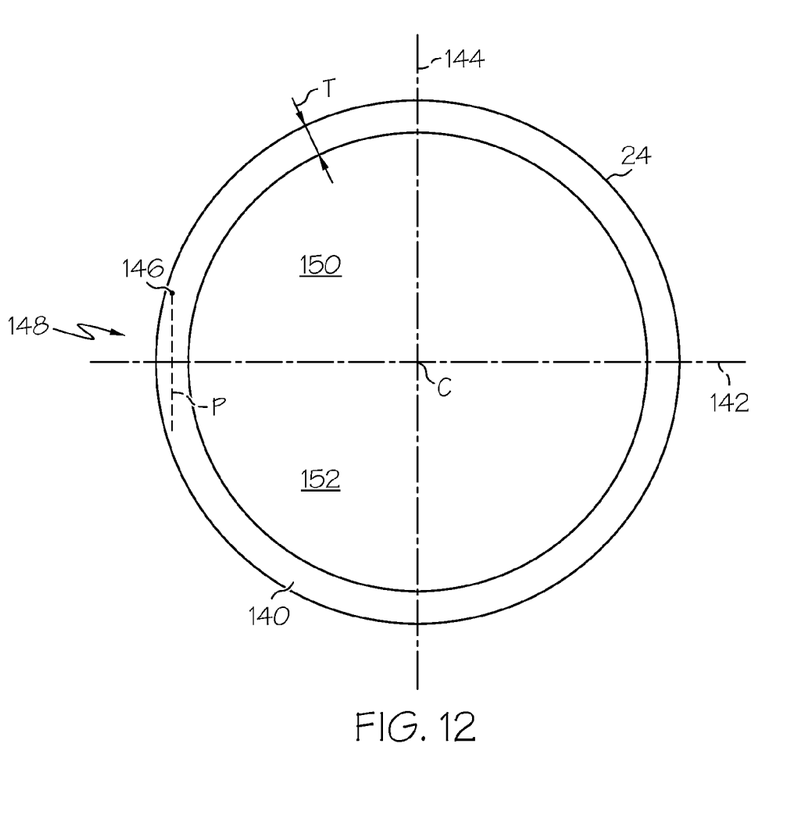
FIG. 12 illustrates an upper edge surface of a cylinder liner according to one or more embodiments shown and described herein.

As can be seen by FIG. 6, the sensors 74, 76, 78 and 80 may be offset from a center of the cylinder liners 24, 26 and/or 28 in the cross-conveyor direction. Referring to FIG. 12, the upper end surface 140 of the cylinder liner 24 is illustrated divided into quadrants with imaginary dividing lines 142 and 144 passing through the center C of the cylinder liner 24. The dividing line 142 runs in the cross-conveying direction while the dividing line 144 runs in the conveying direction. The sensor 74 may be positioned to direct a beam 146 of light along an outer side 148 of the upper end surface 140 as the cylinder liner 24 passes beneath the sensor 74. In the illustrated embodiment, the sensor 74 may be positioned such that the beam 146 strikes the upper end surface 140 in forward quadrant 150, passing across the dividing line 142 along path P and into the rearward quadrant 152. Locating the sensor 74 offset from the center C of the cylinder liner 24 can maximize the sensing zone on the upper end surface 140 through which the beam 146 passes as the cylinder liner 24, 26 and/or 28 moves in the conveying direction, which can improve reliability. For example, the length of P may be greater than a wall thickness T of the cylinder liner 24 along line 144, which may provide more opportunity for a reliable reading.

Figure 13:
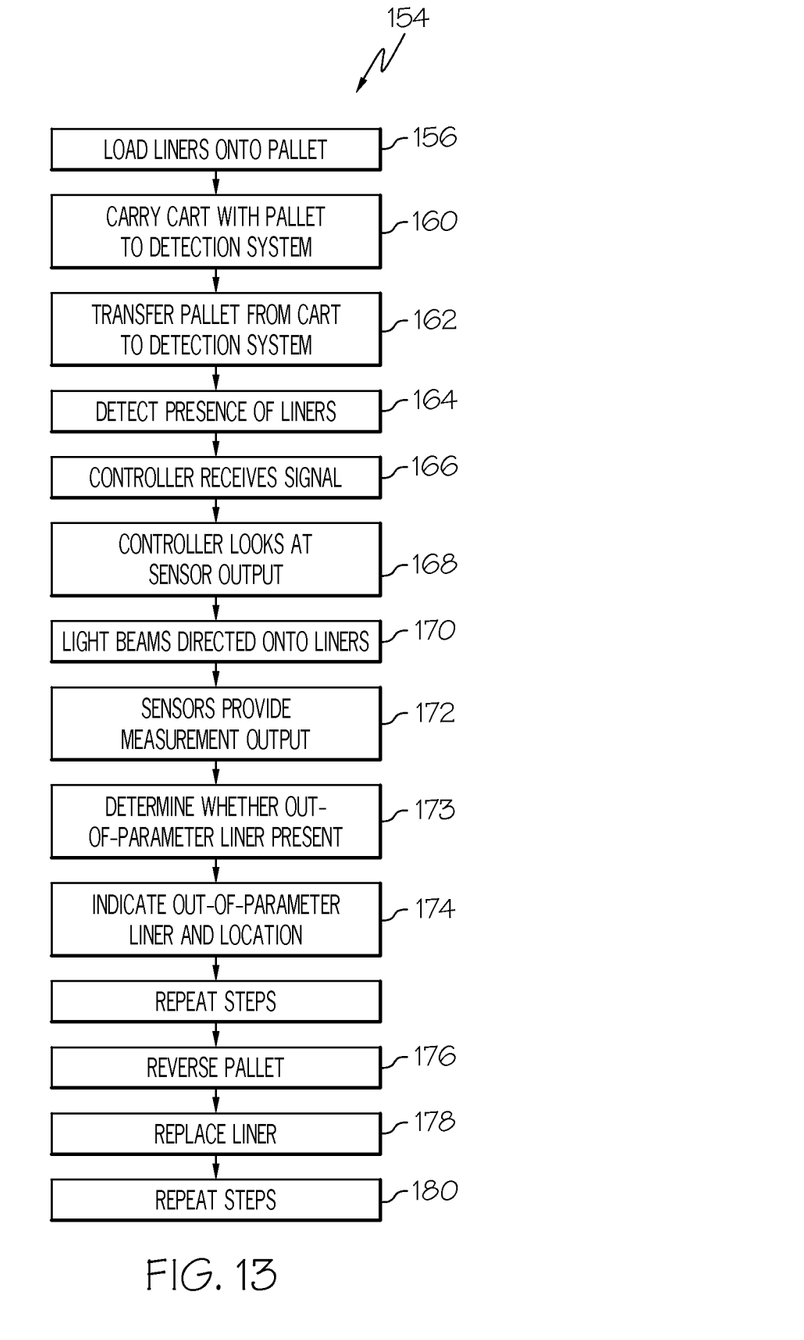
FIG. 13 illustrates a method for detecting the presence of an out-of-parameter cylinder liner according to one or more embodiments shown and described herein.

FIG. 13 illustrates one embodiment of a method 154 for detecting the presence of an out-of-parameter cylinder liner. At step 156, the cylinder liners 24 are loaded onto the pallet 30. In some embodiments, only cylinder liners 24 of the same height are loaded onto the pallet 30. However, in the illustrated embodiment, a cylinder liner 26 of a different height is inadvertently loaded onto the pallet 30. At step 160, the loaded pallet 30 is carried to the detection system 10 using the cart 48. Once at the detection system 10, the loaded pallet 30 is automatically transferred at step 162 from the cart 48 through the exit 60 using the electric actuators 62 operatively connected to the conveyor elements. As the pallet 30 is conveyed, the cylinder liners 24 and 26 in the forward row break the proximity sensor 121 at step 164 such that the receiver 125 no longer receives a beam of light from the transmitter 123. At step 166, a controller receives an output signal generated by the receiver 125 indicating that the beam of light has been interrupted. The controller looks at the output of the sensors 74, 76, 78 and 80 in response to the output signal at step 168 while, at step 170, the sensors 74, 76, 78 and 80 simultaneously direct the beam 146 of light along the outer sides 148 of the upper end surfaces 140 of the cylinder liners 24 and 26 in the front row as described above with reference to FIG. 12. The sensors 74, 76, 78 and 80 provide an output (e.g. 1 and/or 2) or no output based on the distance measurement taken by the individual sensors 74, 76, 78 and 80 at step 172. For example, no output may correspond to the cylinder liners 24 having the height $H_1$, an output of 1 may correspond to cylinder liners 26 having the height $H_2$ and an output of 2 may correspond to cylinder liners 28 having the height $H_3$. The outputs or lack thereof are provided to the controller, which determines whether an out-of-parameter cylinder liner is present on the pallet 30 (e.g., a non-zero output) at step 173. Since the pallet 30 includes cylinder liner 26 in this example, the output signal 1 may be provided to the controller from the sensor 76 (the other sensors 74, 78 and 80 provide no output signal) and a signal may be generated at step 174 that indicates an out-of-parameter cylinder liner 26 is present to the operator and the position of the cylinder liner 26 on the pallet 30. The above steps may then be repeated for the rearward row of cylinder liners at step 175. The pallet 30 may then be reversed out of the detection system 10 and sent back toward the operator at step 176. At step 178, the operator may replace the out-of-parameter cylinder liner 26 with a different cylinder liner 24. The pallet 30 may again be conveyed to the detection system 10 at step 180 and the process is repeated until all cylinder liners 24 are the requested size.

Figure 14:
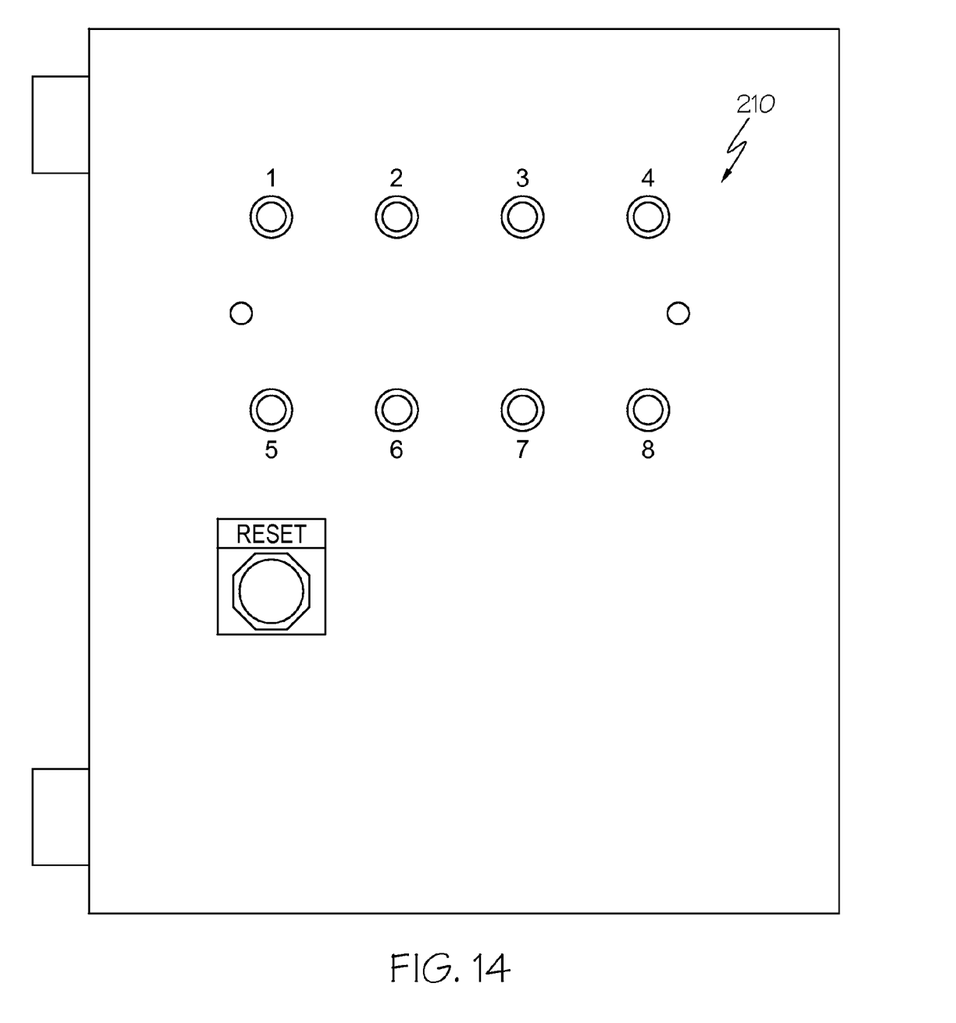
FIG. 14 illustrates a control panel that provides an indication of position of an out-of-parameter cylinder liner according to one or more embodiments shown and described herein.

Referring to FIG. 14, a control panel 210 may be provided for indicate which cylinder of which row is out-of-parameter. Each indicator light 1-4 may correspond to the first (or forward) row of cylinder liners and each indicator light 5-8 may correspond to the second (or rearward) row of cylinder liners. Each light 1-4 and 5-8 is associated with a respective sensor 74, 76, 78 and 80. For example, light 1 may be associated with sensor 74, light 2 associated with sensor 76, light 3 associated with sensor 78 and light 4 associated with sensor 80. Similarly, light 5 may be associated with sensor 74, light 6 associated with sensor 76, light 7 associated with sensor 78 and light 8 associated with sensor 80. The controller may illuminate the lights based on the output (or lack thereof) received from the respective sensors 74, 76, 78 and 80. For example, if an output of a 1 or 2 is received from sensor 74, light 1 may be illuminated, which indicates which cylinder liner is out-of-parameter so that it can be removed. The controller can switch between lights 1-4 and 5-8 based on the output from the receiver 125 indicating that the beam of light has been interrupted.

Figure 15:
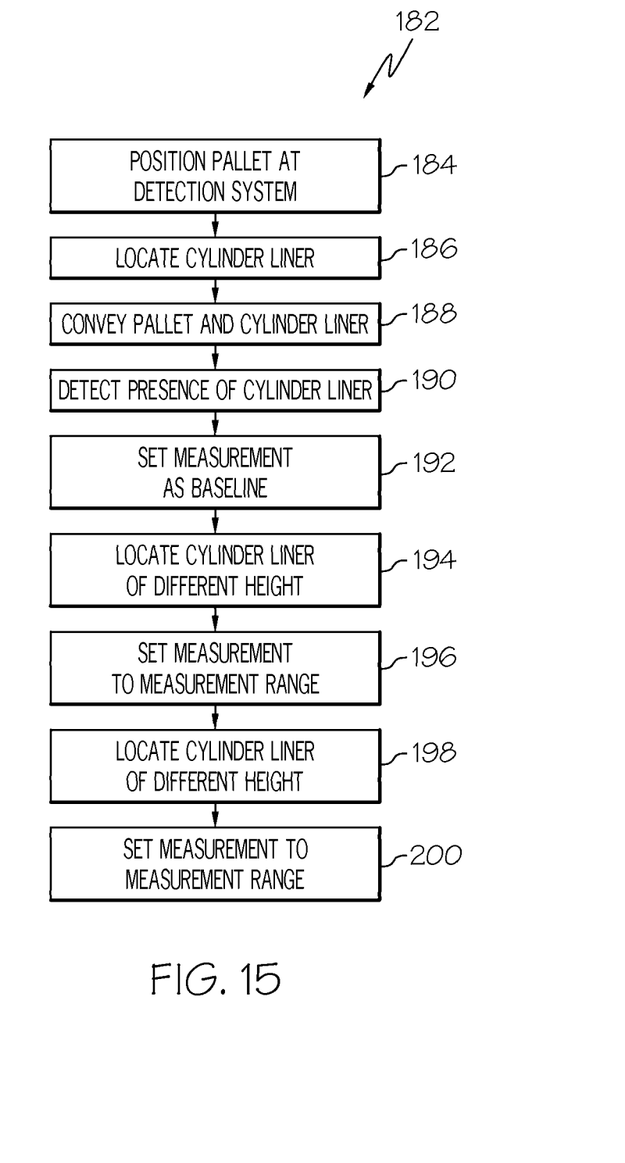
FIG. 15 illustrates a process for initializing the detection system of FIG. 6 according to one or more embodiments shown and described herein.

Referring to FIG. 15, a process 182 for initializing the detection system 10 includes positioning the pallet 30 at the entrance of the detection system 10 at step 184. At step 186, a cylinder liner 24 of known height (e.g., $H_i$) is located at the first column in the front row. The pallet 30 and cylinder liner 24 is conveyed into the detection system 10 at step 188. At step 190, the beam of light of the proximity sensor 121 is broken by the cylinder liner 24 and the controller activates the sensors 74, 76, 78 and 80. The measurement detected by the sensor 74 is used as the baseline for the sensor 74 and set to 0 at step 192. The cylinder liner 24 may be removed from the pallet 30 and replaced to verify a 0 reading. At step 194, a cylinder liner 26 is placed at the first column in the front row of the pallet 30. The measurement detected by the sensor (e.g., about 26 corresponding to 2.6 mm) is set to a measurement range (e.g., 19-29 corresponding to 1.9-2.9 mm taller than cylinder liner 24) and assigned an output of 1 at step 196. At step 198, a cylinder liner 28 is placed at the first column in the front row of the pallet 30. The measurement detected by the sensor (e.g., about 191 corresponding to 19.1 mm) is set to a measurement range (e.g., 185-205 corresponding to 18.5-20.5 mm taller than cylinder liner 24) and assigned an output 2 at step 200. The steps are repeated for the remaining sensors 76, 78 and 80.

The above-described detection systems 10 allow for detection of the presence of out-of-parameter cylinder liners in an engine manufacturing process. The detection system 10 may also be used to detect when cylinder liners are tipped over or missing by providing an out-of-parameter indication due to a change in a distance measurement. The pallet of cylinder liners can be sent back to the operator for replacement of one or more of the cylinder liners. The detection system 10 can also indicate the location of the out-of-parameter cylinder liner on the pallet. While the above discussion focuses on cylinder liners for engine manufacture, the detection system may be suitable for use with other tubular members, such as sleeves or any other tube-like part.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for obtaining a measurement in an in-line system for detecting presence of an out-of-parameter part, the method comprising:
   conveying a tubular member having an inner diameter and an outer diameter that define a wall thickness, the tubular member conveyed in a conveying direction to a detection system comprising a laser sensor arranged and configured to direct a beam of light onto an upper end surface of the tubular member for obtaining a measurement, the laser sensor being offset vertically from the upper end surface of the tubular member and offset horizontally in a cross-conveying direction from a center of the tubular member such that the beam of light is directed onto an outer side of the upper end surface between the inner diameter and the outer diameter of the tubular member; and
   directing the beam of light onto the upper end surface at the outer side of the tubular member as to measure a height of the tubular member, the beam of light projecting along a continuous path of the upper end surface from a front quadrant of the upper end surface to a rearward quadrant of the upper end surface, the continuous path having a length that is greater than the wall thickness of the tubular member.

2. The method of claim 1 further comprising loading the tubular member onto a pallet.

3. The method of claim 1 further comprising:
   detecting presence of the tubular member using a proximity sensor;
   generating a signal indicating presence of the tubular member; and
   obtaining an output from the laser sensor in response to the signal if an out-of-parameter tubular member is present.

4. The method of claim 1 wherein the step of conveying a tubular member to the detection system comprises conveying a row of tubular members to the detection system and simultaneously directing multiple beams of light onto upper end surfaces of the tubular members at their outer sides.

5. The method of claim 4, wherein multiple laser sensors are provided for directing the multiple beams of light, wherein each laser sensor is configured to provide a first output in response to a first height measurement and a second output in response to a second height measurement.

6. The method of claim 1, wherein the tubular member is selected from a group of cylinder liners having at least two heights.

7. A method of detecting presence of an out-of-parameter part among multiple parts, the method comprising:
  setting a baseline measurement for each of a plurality of laser sensors; and
  conveying a row of tubular members, the tubular members each having an outer diameter, a bore extending therethrough having an inner diameter, and a wall thickness, the tubular members conveyed in a conveying direction to a detection system comprising the plurality of laser sensors, the plurality of laser sensors being arranged offset vertically from the upper end surface of the tubular members and offset horizontally in a cross-conveying direction from centers of the tubular members and configured to direct a beam of light onto an upper end surface of the tubular members between the inner diameter and the outer diameter of the tubular members for obtaining an in-line measurement of a height of each of the tubular members, wherein the beam of light projects along a continuous path on the upper end surface from a front quadrant of the upper end surface to a rearward quadrant of the end surface, the continuous path having a length that is greater than the wall thickness of the tubular member;
  wherein an output is provided by one or more of the laser sensors if the in-line measurement is outside the baseline measurement.

8. The method of claim 7 further comprising a controller that receives the output indicating that one or more of the laser sensors detects that the associated tubular member has a measurement outside the baseline measurement.

9. The method of claim 8 further comprising conveying the row of tubular members in a reverse direction away from the detection system which stops the row of tubular members from passing to a subsequent process station if the output indicating a measurement outside the baseline measurement is received by the controller.

10. The method of claim 7 further comprising positioning the plurality of laser sensors offset from centers of each of the tubular members in the cross-conveying direction such that the beams of light are directed onto outer sides of the upper end surfaces.

11. The method of claim 7 further comprising:
  detecting presence of the row of tubular members using a proximity sensor;
  generating a signal indicating presence of the row of tubular members; and
  providing the output by the one or more of the laser sensors if the in-line measurement is outside the baseline measurement.

12. The method of claim 7, wherein the baseline measurement is a range of measurement values.

13. The method of claim 7, wherein the tubular member is selected from a group of cylinder liners having at least two heights.

14. A system for use in detecting presence of an out-of-parameter part in an in-line process, the system comprising:
  a conveyor system that conveys a tubular member in a conveying direction, the tubular member having an outer diameter, a bore extending therethrough having an inner diameter, and a wall thickness;
  a frame located above the conveyor system; and
  a laser sensor supported by the frame above the conveyor system, the laser sensor arranged and configured to direct a beam of light onto an upper end surface of a tubular member between the inner diameter and the outer diameter of the tubular member for obtaining an in-line measurement, the laser sensor being offset vertically from the upper end surface of the tubular member and offset horizontally in a cross-conveying direction from a center of the tubular member such that the beam of light is directed onto an outer side of the upper end surface of the tubular member as to measure a height of the tubular member, the beam of light projecting along a continuous path relative to the tubular member from a front quadrant of the upper end surface to a rearward quadrant of the upper end surface as the tubular member is conveyed in the conveying direction.

15. The system of claim 14, wherein the continuous path has a length that is greater than a wall thickness of the tubular member.

16. The system of claim 14, wherein the laser sensor is configured to provide an output if the in-line measurement is outside the baseline measurement.

17. The system of claim 16 further comprising a controller that receives the output from the laser sensor, the controller controls operation of the conveyor system depending on receipt of the output.

18. The system of claim 17, wherein the controller reverses operation of the conveyor system upon receipt of the output thereby preventing the tubular member having a dimension outside of the baseline from moving to a subsequent process station.

19. The system of claim 17 further comprising a proximity sensor configured to provide a signal to the controller indicating presence of the tubular member.

20. The system of claim 14 comprising multiple laser sensors supported by the frame above the conveyor system, the laser sensors arranged and configured to direct beams of light onto upper end surfaces of multiple tubular members simultaneously for obtaining multiple in-line measurements, the laser sensors being offset from the centers of their respective tubular members in a cross-conveying direction such that the beams of light are directed onto outer sides of the upper end surfaces of the respective tubular members, each beam of light moving along a respective continuous path relative to the respective tubular members from a front quadrant of the upper end surfaces to a rearward quadrant of the upper end surfaces as the tubular members are conveyed in the conveying direction.

* * * * *